Figure 1:
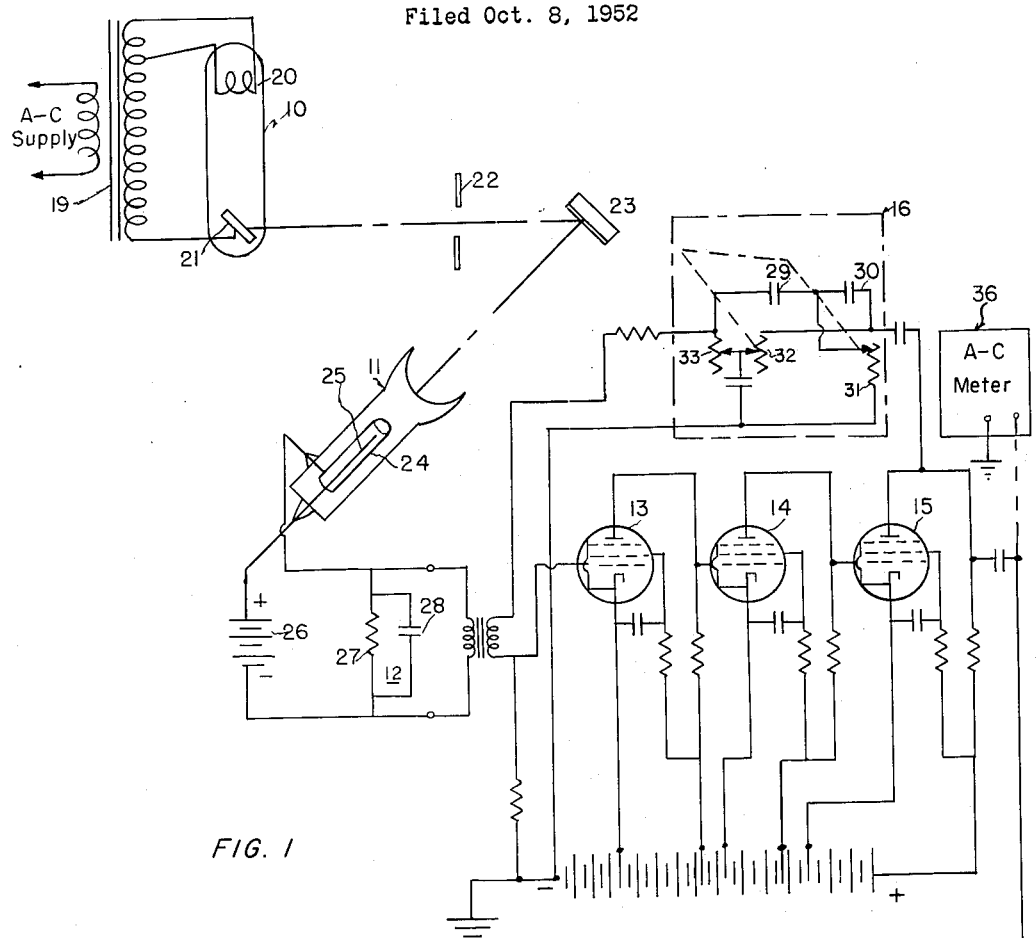

May 8, 1956     E. A. HAMACHER     2,745,019
X-RAY INTENSITY MEASURING SYSTEM
Filed Oct. 8, 1952

Inventor
EDWARD A. HAMACHER
By
Agent

United States Patent Office 2,745,019
Patented May 8, 1956

2,745,019
X-RAY INTENSITY MEASURING SYSTEM

Edward A. Hamacher, Irvington-on-Hudson, N. Y., assignor, by mesne assignments, to North American Philips Company, Inc., New York, N. Y., a corporation of Delaware Application October 8, 1952, Serial No. 313,720

11 Claims. (Cl. 250—83.6)

The present invention relates generally to a method and apparatus for measuring the intensity of X-ray radiation. Such apparatus has wide utility and may be used, for example, for strip metal gauging, measurement of thin coatings and in absorption and fluorescence methods of chemical analysis.

In the measurement of X-ray intensity by the use of a gaseous ionization or Geiger-Müller tube, several techniques are presently known for indicating the X-ray quanta detected by the tube. If the ionization tube is included in a direct-voltage circuit which impresses an electric field between the tube electrodes, it will behave as an ionization chamber at relatively low voltage values, while at intermediate voltage values it will act as a proportional counter and at high voltage values as a Geiger counter. The proportional counter region and the Geiger counter region are characterized by gas amplification, whereby the original number of ions are considerably multiplied. Although the multiplication factor is far greater in the Geiger region, the use of the proportional region is frequently advantageous because of its linearity of response to the intensity of X-ray radiation, particularly at high counting rates.

When using the ionization tube in the proportional counter region, it has heretofore been the practice for purposes of measurement either to count the individual pulses yielded by the tube or to determine the average current flow therethrough. In the pulse counting technique, with a proportional counter, there is ordinarily entailed the use of an amplifier and scaler as well as a counting rate meter. Due to the nature of the generated pulses, the amplifier must have a high gain as well as a wide band width, while the scaler and rate meter must possess a short resolving time. On the other hand, in the technique in which the average current through the proportional counter tube is measured, direct-current amplification is necessarily involved and the gain must be high inasmuch as the currents developed in the proportional counter tube are very minute, i. e., in the order of hundredths or thousandths of a microampere.

Thus whichever of the above-described techniques is employed, there arise certain practical drawbacks, in that broadband alternating current amplifiers or direct-current amplifiers having a high gain are of relatively complex design and in some instances are lacking in stability.

Accordingly, it is the primary object of the present invention to provide an X-ray intensity measuring system including a proportional counter tube, which system avoids the drawbacks attending prior art arrangements. More specifically, it is the object of the invention to provide a system of this type which is of relatively simple design and yet is characterized by improved stability and a more favorable signal to noise ratio.

Briefly stated, these objects are attained in an arrangement wherein the X-ray source produces periodic surges of radiant energy and wherein the proportional counter tube circuit responsive to the quanta of X-rays emitted from the specimen under test successively produces discrete trains of impulses. The impulse trains are then integrated to provide periodic pulses whose frequency corresponds to the recurrence rate of said surges and whose amplitude is modulated as a function of the number of impulses within each train. These amplitude modulated pulses are amplified in a narrow band A.-C. amplifier preferably selective to the frequency of said pulses and are then fed to an A.-C. meter, or following suitable rectification are applied to a standard direct-current meter or recorder.

Figure 2:
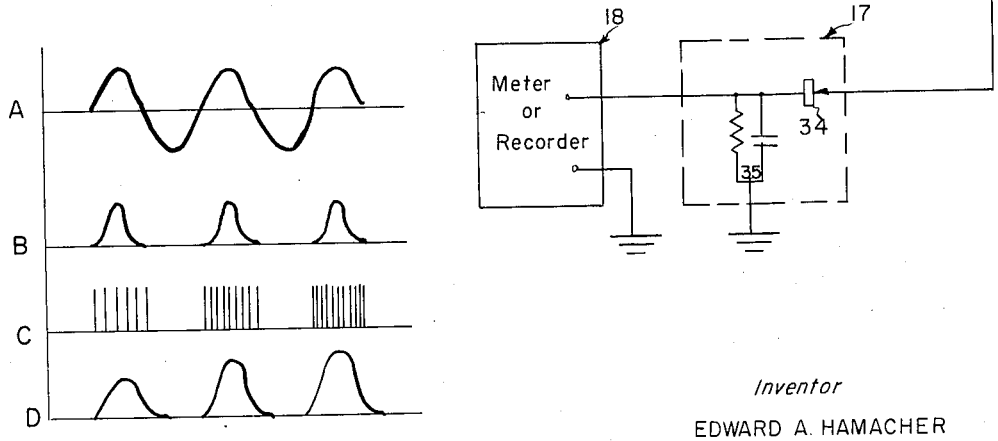

For a better understanding of the invention, as well as other objects and further features thereof, reference is had to the following detailed description of the invention to be read in conjunction with the accompanying drawing wherein:

Fig. 1 is a schematic diagram of one preferred embodiment in accordance with the invention; and Fig. 2 consists of graphs explanatory of the operation of the system disclosed in Fig. 1.

Referring now to the drawing and more particularly to Fig. 1, the major elements of a preferred system in accordance with the invention comprise a pulsatory X-ray source including an X-ray tube 10, a gaseous ionization tube 11, an integrating network 12, a frequency selective alternating-current amplifier provided with electron discharge tubes 13, 14 and 15 and a degenerative feedback network 16, an averaging circuit 17, and a meter or recording device 18.

The invention entails a source of X-ray radiation adapted to generate periodic surges of radiant energy and for this purpose there is shown, by way of example, an arrangement wherein the X-ray tube 10 is energized by an alternating-current supply connected to the primary of a voltage step-up transformer 19 whose secondary has a tapped portion supplying a relatively low voltage to the filament 20 of the tube, the full value of A.-C. voltage developed across the secondary being applied to the X-ray tube 10 between its anode 21 and the filament 20, whereby the tube is conductive when the anode is positive relative to the filament. Thus the tube acts as an alternating-current half-wave rectifier and produces a surge of radiation during each positive half-cycle of voltage applied to the anode thereof.

Referring for a moment to Fig. 2, the voltage provided by the alternating-current supply is represented graphically along base line A, this voltage having the usual sinusoidal form and a frequency, say of 60 cycles per second. Inasmuch as the X-ray tube 10 conducts for only half the line voltage cycle, it generates periodic surges of radiant energy having approximately the form shown along base line B, the recurrence rate of the surges in this example being 60 cycles per second. In this connection it is noted that should full wave rectification be used, whereby the tube is caused to conduct during both halves of the A.-C. cycle, the surge rate would then be 120 cycles per second.

Returning now to Fig. 1, it will be seen that the periodic surges from X-ray tube 10 are directed through the usual slit means 22 to a specimen 23 under examination, the rays leaving the object being detected by the ionization tube 11. It is to be noted that the invention does not relate to any one method of X-ray analysis. That is to say, whether the primary X-ray surges are passed through the specimen to be absorbed in accordance with the thickness thereof or are reflected or diffracted by the specimen as in other techniques, the invention will in any event act to measure the intensity of the secondary beam leaving the specimen. The ionization tube 11 comprises a cylindrical cathode 24 and an anode wire 25 coaxially disposed with the cathode, the electrodes being enclosed in an envelope filled with an ionizable gas. An electric field is established between the electrodes by means of a suitable high-voltage source 26 which is applied to the electrodes through resistor 27 of the integrating network, said source preferably having a magnitude at which the tube is operative in the proportional counter region.

In consequence, for each surge of X-ray energy during its period of occurrence, the emission of X-ray quanta from the specimen under test is detected by the tube to produce a train of impulses (as shown along base line C in Fig. 2); the number of impulses in the train being proportional to the intensity of the secondary X-ray emission from the specimen. Since the X-ray surges occur periodically, there is developed across resistor 27, assuming the absence of the parallel capacitor 28 forming therewith an integrating network, successive trains of impulses, as shown along base line C in Fig. 2. The three successive trains along base line C have been made to illustrate three different intensity levels; hence it will be seen that the first train has a relatively small number of impulses, the second train a larger number and the third train a still larger number of impulses.

The integrating network 12 serves to integrate the impulses in each train and is designed to possess a time constant which is shorter than the time interval between succeeding X-ray surges (line B, Fig. 2) but is longer than the duration of the individual impulses making up the train (line C, Fig. 2). As a consequence (as shown along line D, Fig. 2), developed across the integrating network are periodic pulses each representing the integrated value of a respective impulse train. It is evident, therefore, that the greater the number of impulses forming the train, the higher the amplitude of the resultant integrated pulse.

Otherwise stated, the periodic pulses yielded by the integrating network may be regarded as a carrier whose frequency corresponds to the recurrence rate of the X-ray surges produced by the source, which carrier has imposed thereon an amplitude modulation component depending on the counting rate of X-ray quanta emitted from the specimen under inspection. Hence the amplitude of the carrier is higher as the counting rate is higher and lower as the counting rate falls.

This amplitude modulated carrier is applied to the input terminals of the three stage alternating-current amplifier including pentode tubes 13, 14 and 15, the amplifier including a negative feedback or degenerative path 16 constituted by capacitors 29 and 30 and variable resistors 31, 32 and 33 forming a parallel T null network which is selective with regard to the pulse frequency. At the null frequency there is an absence of feedback and the full gain of the amplifier is realized, but at other frequencies there is feedback that reduces the gain, thereby making the amplifier response selective to the null frequency. Concurrent adjustment of resistors 31, 32 and 33 makes it possible to set the selectivity of the amplifier precisely to the carrier frequency of the input pulses, thereby improving the signal to noise ratio of the system.

In order to obtain a direct voltage which varies uninterruptedly in accordance with the counting rate variations of the impulses but is independent of the repetition rate of the X-ray surges, the amplified amplitude-modulated pulses are averaged in circuit 17 by means of a rectifier 34 whose output is applied to an R-C integrating network 35. The time constant of the network is such as to exclude the carrier frequency component of the rectified voltage, thereby smoothing the amplitude modulation component to provide a direct measuring voltage whose value varies in accordance with the average value of the counting rate. This measuring voltage is fed to a suitably calibrated direct-current meter or a conventional moving pen recorder 18 to provide an indication of the counting rate.

If preferred, an alternating current meter or recorder 36 may be connected directly to the output of the amplifier, thereby obviating the need for an averaging circuit.

While there has been shown a preferred embodiment of the invention, it is manifest that many changes and modifications may be made therein without departing from the spirit of the invention.

What is claimed is:

1. The method of X-ray analysis comprising the steps of directing periodic surges of X-ray energy onto a specimen under analysis, the periodicity and amplitude of said surges being independent of the dimensions of said specimen, detecting the resultant X-ray emission from said specimen to produce for each of said surges a discrete train of impulses whose number depends on the intensity of X-ray emission, integrating the successive trains of impulses to produce periodic pulses each of which has an amplitude proportional to the number of impulses in the corresponding train, and measuring the amplitude of said periodic pulses to indicate the intensity of the X-ray emission.

2. The method of X-ray analysis comprising the steps of directing periodic surges of X-ray energy onto a specimen under analysis, the periodicity and amplitude of said surges being independent of the dimensions of said specimen, detecting the resultant X-ray emission from said specimen to produce for each of said surges a train of impulses the number of which depends on the intensity of X-ray emission, integrating the successive trains of impulses to produce periodic pulses each of which has an amplitude proportional to the number of impulses in the related train, amplifying said periodic pulses selectively with respect to the repetition rate thereof, and indicating the amplitude of said amplified periodic pulses to determine the intensity of the X-ray emission.

3. Apparatus for analysis by X-ray radiation comprising means to generate periodic surges of X-ray radiation, means to expose a specimen under analysis to said surges, the periodicity and amplitude of said surges being independent of the dimensions of said specimen, means to detect X-ray emission from said specimen to produce for each of said surges a discrete train of impulses whose number depends on the intensity of said emission, means to integrate each of said trains of impulses to produce periodic pulses which are amplitude-modulated as a function of the counting rate of X-ray quanta emitted from said specimen, and means responsive to the amplitude modulation component on said pulses to produce an indication of the intensity of said emission.

4. Apparatus, as set forth in claim 3, wherein said means to generate periodic surges of X-ray radiation comprises an alternating voltage source, an X-ray tube, and means to connect said tube to said source to render said tube operative solely during the positive half cycles of said voltage.

5. Apparatus for analyzing by X-ray radiation comprising means to generate periodic surges of X-ray radiation, means to expose a specimen to said surges, the periodicity and amplitude of said surges being independent of the dimensions of said specimen, an ionization tube circuit to detect emission from said specimen to produce for each of said surges a discrete train of impulses whose number depends on the intensity of said emission, an integrating network coupled to said tube circuit to integrate each of said trains of impulses to produce periodic pulses amplitude modulated as a function of the counter rate of X-ray quanta emitted from said specimen, and means coupled to said network and responsive to the amplitude modulation component of said pulses to produce an indication of the intensity of said emission.

6. Apparatus, as set forth in claim 5, wherein said ionization tube circuit includes an ionization tube having cathode and anode electrodes and means to apply a direct potential between said electrodes having a value rendering said tube operative in the proportional counter region.

7. Apparatus, as set forth in claim 5, wherein said network has a time constant which is shorter than the time interval between succeeding surges of X-ray energy and longer than the duration of an impulse in said train.

8. Apparatus, as set forth in claim 5, wherein said last-named means includes an amplifier tuned to a frequency corresponding to the repetition rate of said pulses.

9. Apparatus for analyzing by X-ray energy comprising means to generate periodic surges of X-ray energy, means to expose a specimen to said surges, an ionization tube circuit including means to apply a direct voltage to said tube rendering it operative in the proportional region to produce for each of said surges a discrete train of impulses whose number depends on the intensity of emission from said specimen, an integrating network coupled to said circuit to integrate each of said trains to produce periodic pulses amplitude modulated as a function of the counting rate of X-ray quanta emitted from said specimen, a selective amplifier coupled to said network and tuned to the repetition rate of said pulses to produce amplified amplitude modulated pulses, means coupled to the output of said amplifier to produce a direct measuring voltage which varies as the average value of the amplitude modulation on said pulses, and means to indicate said measuring voltage.

10. Apparatus, as set forth in claim 9, wherein said amplifier includes a negative feedback network having a null response at the frequency corresponding to said repetition rate.

11. Apparatus, as set forth in claim 9, wherein said averaging means includes a rectifier coupled to the output of said amplifier to rectify the amplified pulses, and an integrating circuit coupled to said rectifier to filter said rectified pulses.

References Cited in the file of this patent
UNITED STATES PATENTS

| | | |
|---|---|---|
| 2,443,857 | Herzog | June 22, 1948 |
| 2,458,596 | Herzog | Jan. 11, 1949 |
| 2,499,953 | Herzog | Mar. 7, 1950 |
| 2,583,132 | Altar et al. | Jan. 22, 1952 |
| 2,632,117 | Vossberg | Mar. 17, 1953 |
| 2,669,662 | Lundahl et al. | Feb. 16, 1954 |